(12) United States Patent
Chen

(10) Patent No.: US 9,400,081 B1
(45) Date of Patent: Jul. 26, 2016

(54) HANGER ASSEMBLY

(71) Applicant: SAN YU INDUSTRIAL CO., LTD., Taichung (TW)

(72) Inventor: Chiung-Yao Chen, Taichung (TW)

(73) Assignee: San Yu Industrial Co., Ltd., Taichung (TW)

(*) Notice: Subject to any disclaimer, the term of this patent is extended or adjusted under 35 U.S.C. 154(b) by 0 days.

(21) Appl. No.: 14/715,746

(22) Filed: May 19, 2015

(51) Int. Cl.
*F16M 13/02* (2006.01)
*F16B 45/00* (2006.01)
*F16B 2/24* (2006.01)
*A47G 29/08* (2006.01)
*G09F 7/18* (2006.01)

(52) U.S. Cl.
CPC ............ *F16M 13/02* (2013.01); *A47G 29/083* (2013.01); *F16B 2/24* (2013.01); *F16B 2/241* (2013.01); *F16B 45/00* (2013.01); *G09F 2007/1804* (2013.01)

(58) Field of Classification Search
CPC ............ A47G 29/1216; A47G 29/083; B61L 5/1863; F21V 21/116; F16M 13/02; F16B 2/241; F16B 45/00; F16B 7/0486; F16B 2/24; A01M 31/02; G09F 2007/1804; G09F 2007/1834; G09F 2007/1817
USPC ................ 248/219.4, 218.4, 303, 313, 316.7, 248/316.1, 226.11, 227.3, 339, 317, 248/304–307, 300
See application file for complete search history.

(56) References Cited

U.S. PATENT DOCUMENTS

| | | | | |
|---|---|---|---|---|
| 334,825 A * | 1/1886 | Thorn | ........................ | E04G 7/18 182/186.6 |
| 1,007,843 A * | 11/1911 | Botsford | .................... | G09F 7/18 248/218.2 |
| 1,392,716 A * | 10/1921 | Spraggins | ............... | B65B 67/12 248/99 |
| 2,875,902 A * | 3/1959 | Ayars, Jr. | .............. | A47B 81/007 211/182 |
| 3,669,394 A * | 6/1972 | Loucks | .................... | E04F 21/05 248/218.4 |
| 5,476,240 A * | 12/1995 | McDonough | .......... | A46B 17/02 211/65 |
| 5,651,521 A * | 7/1997 | Aberg | .................. | A47B 96/061 248/218.4 |
| 6,287,041 B1 * | 9/2001 | Dudley | ..................... | G09F 3/20 248/226.11 |
| 6,375,141 B1 * | 4/2002 | Kettlestrings | ........ | A47B 43/006 211/106.01 |
| 7,017,876 B1 * | 3/2006 | LeCher | ..................... | A63G 9/00 182/151 |
| 7,677,513 B1 * | 3/2010 | Londo | ..................... | A45B 11/00 248/217.1 |
| 8,678,328 B2 * | 3/2014 | Smith | .................. | F21V 21/0885 248/125.3 |
| 9,296,506 B2 * | 3/2016 | Cundy | ..................... | B65B 67/12 |
| 2005/0269469 A1 * | 12/2005 | Cummins | .............. | B44D 3/123 248/303 |
| 2007/0090251 A1 * | 4/2007 | Padden | ................ | B60N 2/4876 248/303 |
| 2009/0188751 A1 * | 7/2009 | Gilliam | .............. | A62B 35/0068 182/112 |
| 2014/0014796 A1 * | 1/2014 | Carpenter | ................ | G10G 5/00 248/219.4 |

* cited by examiner

*Primary Examiner* — Nkeisha Smith
(74) *Attorney, Agent, or Firm* — Alan D. Kamrath; Kamrath IP Lawfirm, P.A.

(57) ABSTRACT

A hanger assembly includes a frame, two anti-skid pads mounted on the frame, and a hook mounted on the frame. The frame includes a first recessed body, a second recessed body, and a fixed post. The first recessed body has a first transverse bar, two first side bars, a first slot, and a first stop. The second recessed body has a second transverse bar, two second side bars, a second slot, and a second stop. The fixed post is mounted between the first recessed body and the second recessed body, with an entrance being defined between the first recessed body and the second recessed body. The two anti-skid pads are respectively mounted on the first stop and the second stop. The hook is mounted on the second stop.

10 Claims, 9 Drawing Sheets

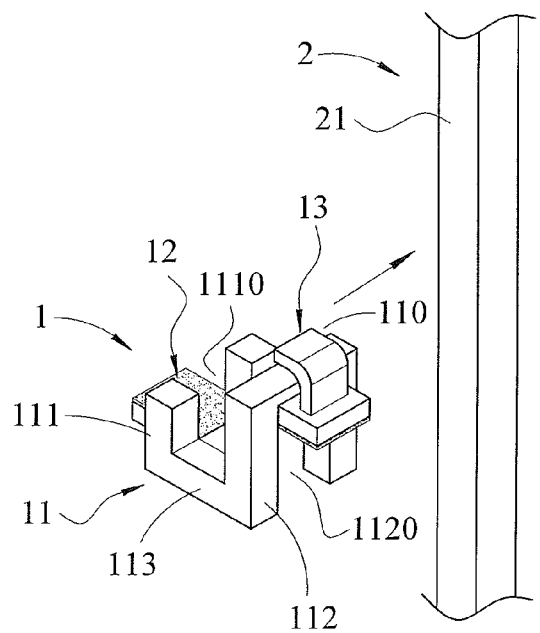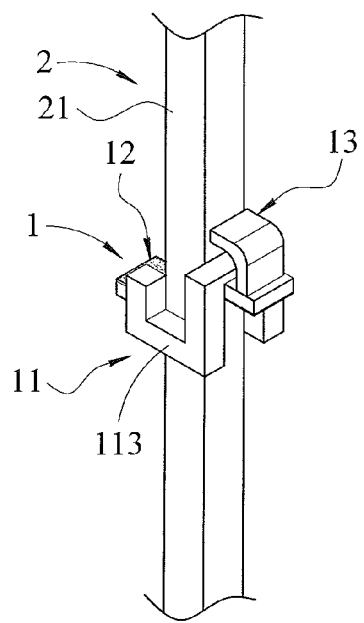
F I G . 5   F I G . 5a

HANGER ASSEMBLY

BACKGROUND OF THE INVENTION

1. Field of the Invention

The present invention relates to a hanger and, more particularly, to a hanger assembly that is attached to a stand for hanging an item, such as an article of clothing, pants, a hat, a bag and the like.

2. Description of the Related Art

A conventional hanger assembly (such as a coat tree) comprises an upright, a base mounted on the bottom of the upright, and a plurality of hooks mounted on the top of the upright for hanging clothes, hats or bags. However, the hooks are affixed to the upright so that the height of the hooks is fixed and cannot be adjusted to fit the user's requirement. In addition, the hooks are mounted on the upright by screwing or soldering so that the conventional hanger assembly is not assembled easily and quickly.

BRIEF SUMMARY OF THE INVENTION

In accordance with the present invention, there is provided a hanger assembly comprising a frame, two anti-skid pads mounted on the frame, and a hook mounted on the frame. The frame includes a first recessed body, a second recessed body, and a fixed post. The first recessed body of the frame has a first transverse bar, two first side bars extending from two sides of the first transverse bar, a first slot defined between the two first side bars, and a first stop mounted on the first transverse bar. The second recessed body of the frame has a second transverse bar, two second side bars extending from two sides of the second transverse bar, a second slot defined between the two second side bars, and a second stop mounted on the second transverse bar. The fixed post of the frame is mounted between the first recessed body and the second recessed body to connect the first recessed body and the second recessed body, with an entrance being defined between the first recessed body and the second recessed body. The two anti-skid pads are respectively mounted on the first stop of the first recessed body and the second stop of the second recessed body. The hook is mounted on the second stop of the second recessed body of the frame. The hook and one of the two anti-skid pads are located at two opposite faces of the second stop of the second recessed body.

According to the primary advantage of the present invention, the hanger assembly is adjustably mounted on the stand so that the user can freely adjust the height of the hanger assembly so as to fit the user's practical requirement.

According to another advantage of the present invention, the user only needs to rotate the hanger assembly to attach the hanger assembly to the stand so that the hanger assembly is mounted on the stand easily, conveniently and quickly.

According to a further advantage of the present invention, the first stop of the first recessed body and the second stop of the second recessed body are forced by the weight of the item to press the stand so that the hanger assembly is suspended on the stand closely.

According to a further advantage of the present invention, the two anti-skid pads abut the stand to provide an anti-skid effect so that the hanger assembly is firmly positioned on the stand.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 5 is a schematic operational view of the hanger assembly for a rectangular upright of a stand.

FIG. 5*a* is a perspective assembly view of the hanger assembly and the rectangular upright of the stand as shown in FIG. 5.

Figures 6, 6A:
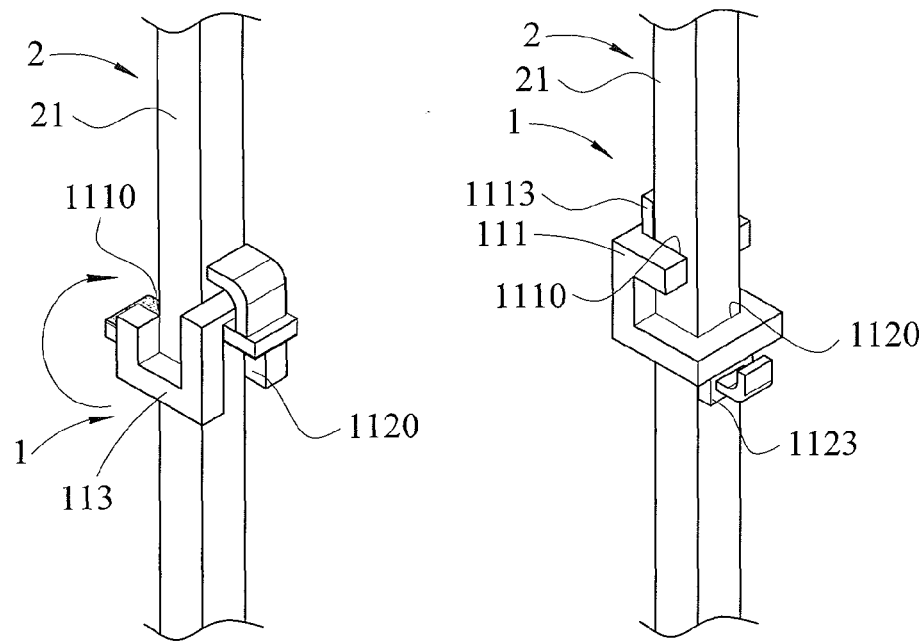

FIG. 6 is a schematic operational view of the hanger assembly as shown in FIG. 5*a*.

FIG. 6*a* is a schematic operational view of the hanger assembly as shown in FIG. 6.

Figure 7:
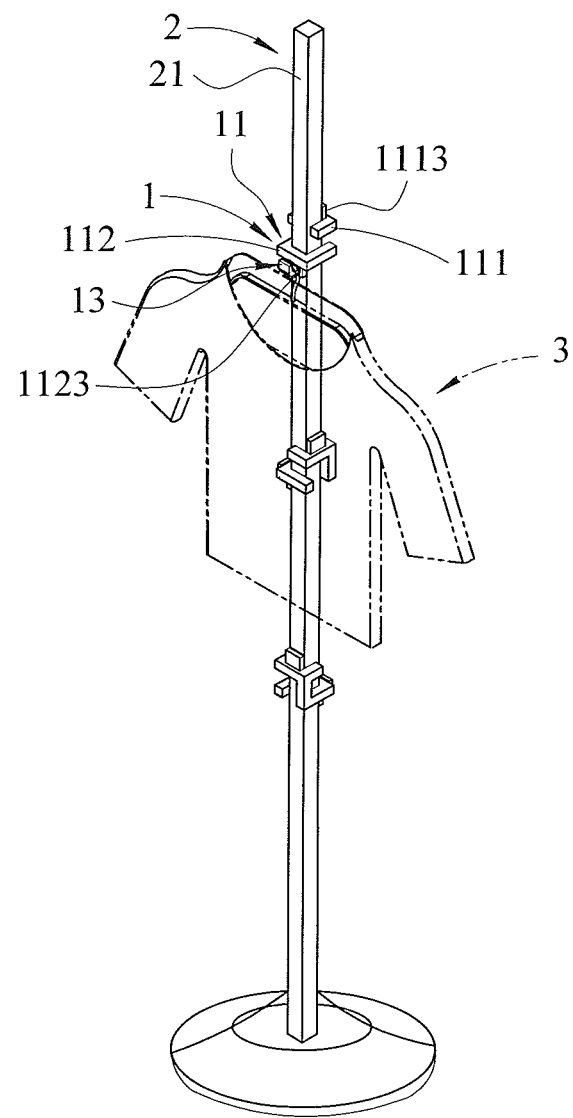

FIG. 7 is a schematic perspective view of the hanger assembly and the rectangular upright of the stand for hanging an item.

Figure 8:
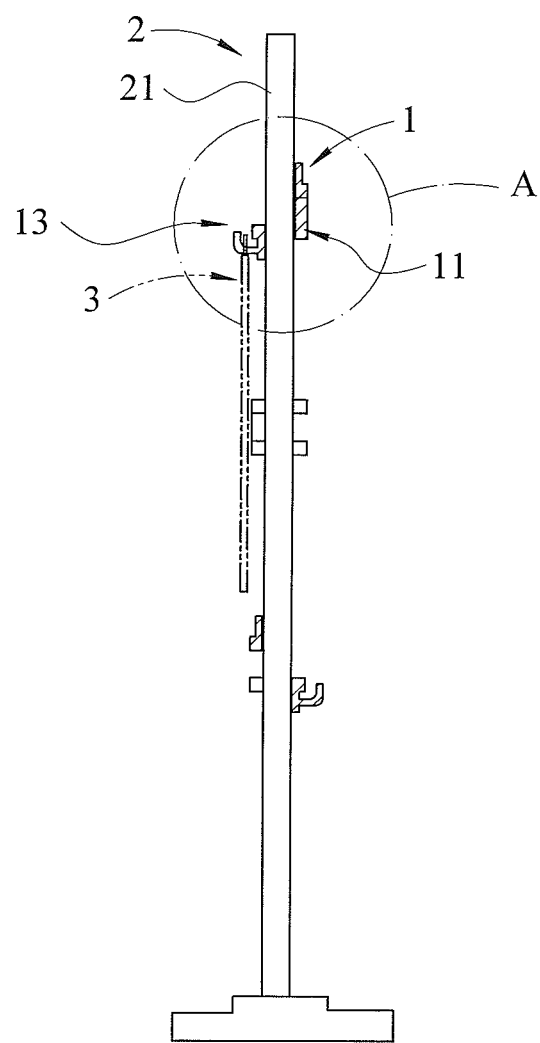

FIG. 8 is a side cross-sectional view of the hanger assembly and the rectangular upright of the stand for hanging an item as shown in FIG. 7.

Figure 9:
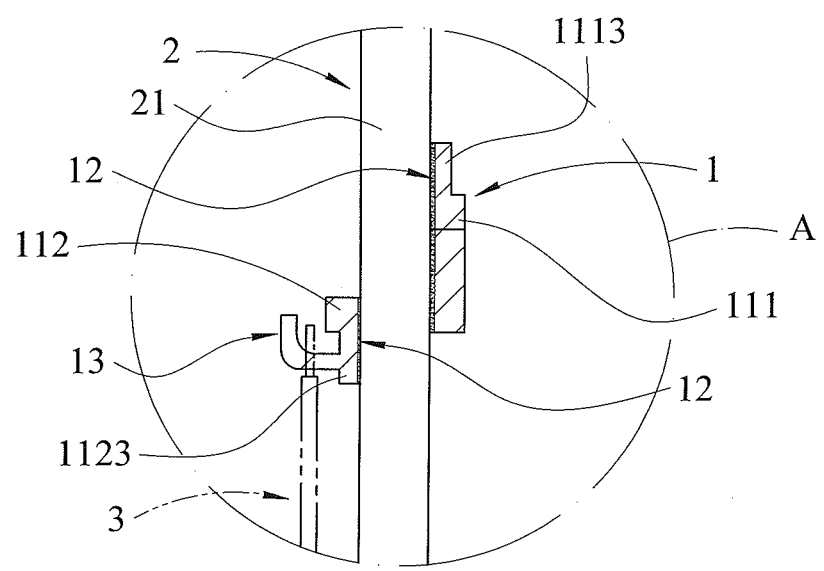

FIG. 9 is a locally enlarged view of the hanger assembly and the rectangular upright of the stand for hanging an item as shown in FIG. 8.

DETAILED DESCRIPTION OF THE INVENTION

Figure 1:
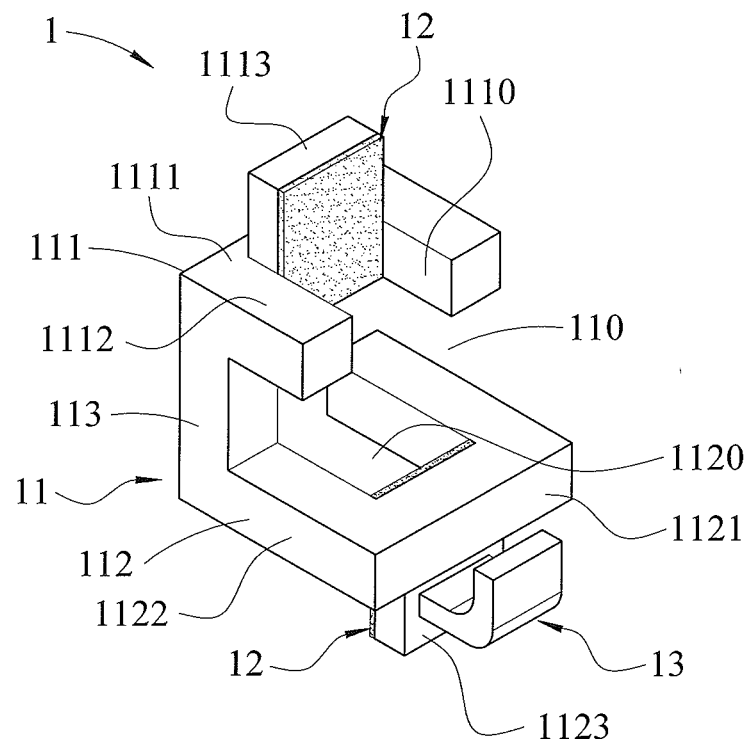
FIG. 1 is a perspective view of a hanger assembly in accordance with the preferred embodiment of the present invention.

Referring to the drawings and initially to FIG. 1, a hanger assembly 1 in accordance with the preferred embodiment of the present invention comprises a frame 11, two anti-skid pads 12 mounted on the frame 11, and a hook 13 mounted on the frame 11.

The frame 11 includes a first recessed body 111, a second recessed body 112, and a fixed post 113. The first recessed body 111 of the frame 11 has a first transverse bar 1111, two first side bars 1112 extending from two sides of the first transverse bar 1111, a first slot 1110 defined between the two first side bars 1112, and a first stop 1113 mounted on the first transverse bar 1111. The first transverse bar 1111 and the two first side bars 1112 construct a substantially U-shaped structure. The first stop 1113 of the first recessed body 111 is mounted on a top face of the first transverse bar 1111 and extends upward. The second recessed body 112 of the frame 11 has a second transverse bar 1121, two second side bars 1122 extending from two sides of the second transverse bar 1121, a second slot 1120 defined between the two second side bars 1122, and a second stop 1123 mounted on the second transverse bar 1121. The second transverse bar 1121 and the two second side bars 1122 construct a substantially U-shaped structure. The second stop 1123 of the second recessed body 112 is mounted on a bottom face of the second transverse bar 1121 and extends downward. The second slot 1120 of the second recessed body 112 corresponds to and aligns with the first slot 1110 of the first recessed body 111. The fixed post 113 of the frame 11 is mounted between the first recessed body 111 and the second recessed body 112 to connect the first recessed body 111 and the second recessed body 112, with an entrance 110 being defined between the first recessed body 111 and the second recessed body 112. The fixed post 113 of the frame 11 has a first end connected with a bottom face of the first transverse bar 1111 and a second end connected with a front end of one of the two second side bars 1122.

In the preferred embodiment of the present invention, the first recessed body 111, the second recessed body 112 and the fixed post 113 are formed integrally. Alternatively, the first recessed body 111, the second recessed body 112 and the fixed post 113 are combined by an adhesive or by soldering.

Each of the two anti-skid pads 12 is made of elastomeric material with an anti-skid effect. The two anti-skid pads 12 are respectively mounted on the first stop 1113 of the first recessed body 111 and the second stop 1123 of the second recessed body 112. Preferably, each of the two anti-skid pads 12 further extends into and sticks to a wall of the first slot 1110 of the first recessed body 111 and a wall of the second slot 1120 of the second recessed body 112.

The hook 13 is mounted on the second stop 1123 of the second recessed body 112 of the frame 11. The hook 13 and one of the two anti-skid pads 12 are located at two opposite faces of the second stop 1123 of the second recessed body 112.

Figure 2:
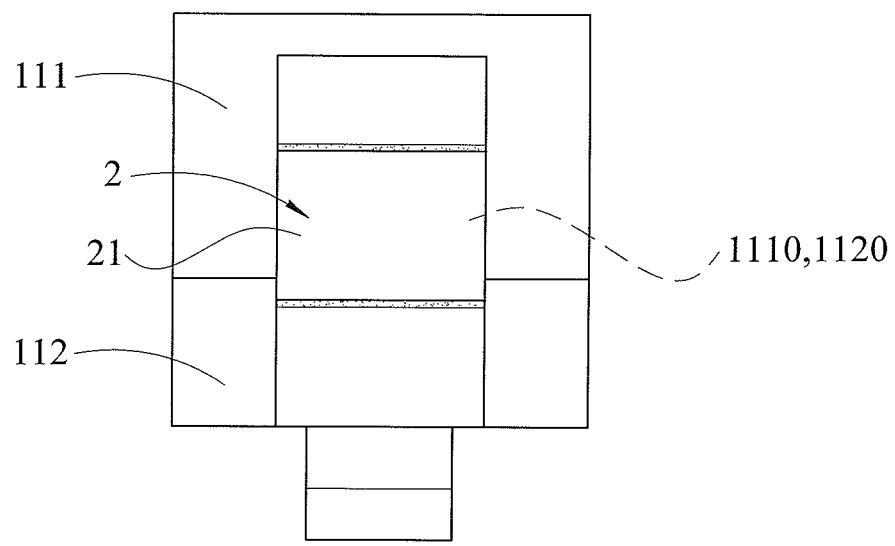
FIG. 2 is a top assembly view showing the hanger assembly being mounted on a rectangular upright of a stand.

Referring to FIG. 2 with reference to FIG. 1, the first slot 1110 of the first recessed body 111 and the second slot 1120 of the second recessed body 112 construct a rectangular shape so that the first recessed body 111 and the second recessed body 112 are firmly attached to a rectangular upright 21 of a stand 2.

Figure 3:
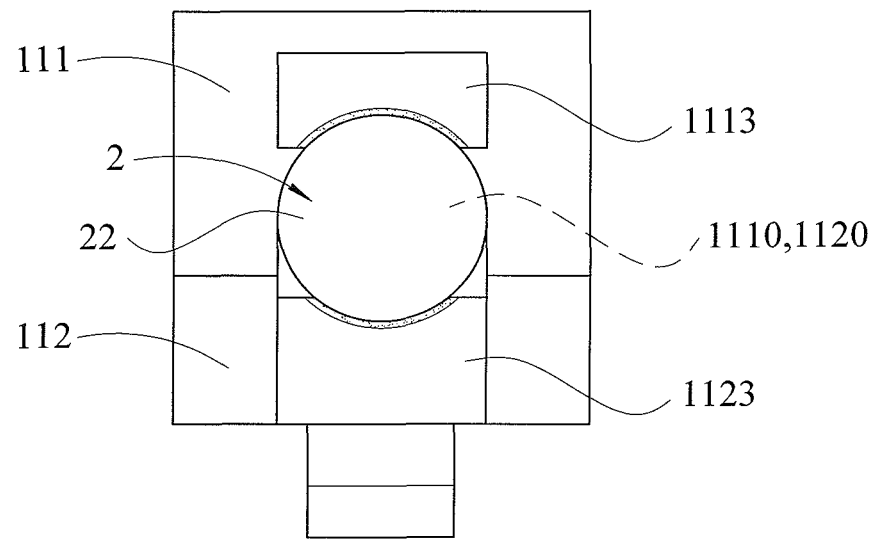
FIG. 3 is a top assembly view showing the hanger assembly being mounted on a circular upright of a stand.

Referring to FIG. 3, the first slot 1110 of the first recessed body 111 and the second slot 1120 of the second recessed body 112 construct a circular shape so that the first recessed body 111 and the second recessed body 112 are firmly attached to a circular upright 22 of a stand 2. At this time, the first stop 1113 of the first recessed body 111 has an arcuate face abutting the circular upright 22, and the second stop 1123 of the second recessed body 112 has an arcuate face abutting the circular upright 22.

Figure 4:
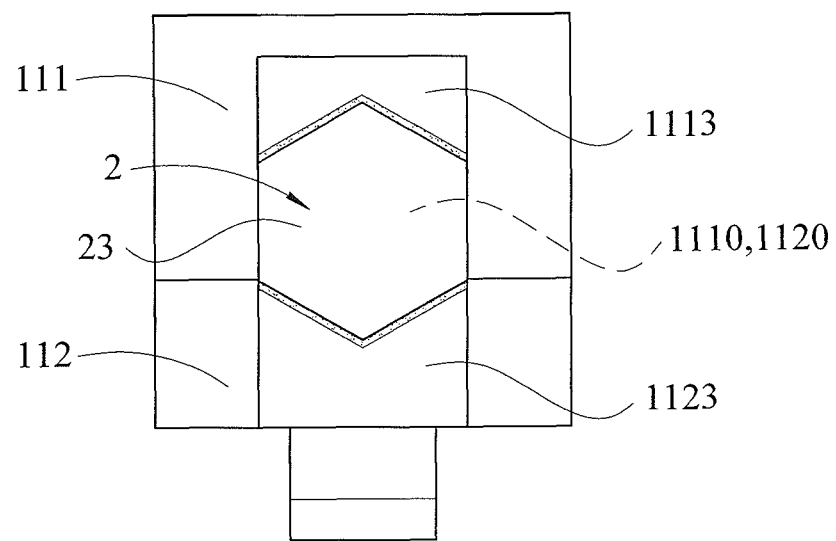
FIG. 4 is a top assembly view showing the hanger assembly being mounted on a polygonal upright of a stand.

Referring to FIG. 4, the first slot 1110 of the first recessed body 111 and the second slot 1120 of the second recessed body 112 construct a polygonal shape so that the first recessed body 111 and the second recessed body 112 are firmly attached to a polygonal upright 23 of a stand 2. At this time, the first stop 1113 of the first recessed body 111 has a polygonal face abutting the polygonal upright 23, and the second stop 1123 of the second recessed body 112 has a polygonal face abutting the polygonal upright 23.

In assembly, referring to FIGS. 5 and 6 with reference to FIGS. 1 and 2, the entrance 110 of the frame 11 aligns with the rectangular upright 21 of the stand 2 as shown in FIG. 5. Then, the frame 11 is pushed toward the stand 2 so that the entrance 110 of the frame 11 allows entrance of the rectangular upright 21 of the stand 2, and the fixed post 113 of the frame 11 abuts the rectangular upright 21 of the stand 2 as shown in FIG. 5a. At this time, the rectangular upright 21 of the stand 2 aligns with the first slot 1110 of the first recessed body 111 and the second slot 1120 of the second recessed body 112. Then, the frame 11 is rotated relative to the rectangular upright 21 of the stand 2 as shown in FIG. 6, so that the rectangular upright 21 of the stand 2 is received in the first slot 1110 of the first recessed body 111 and the second slot 1120 of the second recessed body 112, while the first stop 1113 of the first recessed body 111 and the second stop 1123 of the second recessed body 112 abut the rectangular upright 21 of the stand 2 as shown in FIG. 6a. Thus, the hanger assembly 1 is attached to the rectangular upright 21 of the stand 2.

In practice, referring to FIGS. 7-9 with reference to FIGS. 1 and 2, when an item 3 (such as an article of clothing, pants, a hat, a bag and the like) is suspended on the hook 13 of the hanger assembly 1, the weight of the item 3 applies a force to the hook 13 to drive the first stop 1113 of the first recessed body 111 and the second stop 1123 of the second recessed body 112 toward the rectangular upright 21 of the stand 2, so that the first stop 1113 of the first recessed body 111 and the second stop 1123 of the second recessed body 112 are forced to closely press the rectangular upright 21 of the stand 2. At this time, the two anti-skid pads 12 abut the rectangular upright 21 of the stand 2 so that the hanger assembly 1 is firmly positioned on the rectangular upright 21 of the stand 2.

Accordingly, the hanger assembly 1 is adjustably mounted on the stand 2 so that the user can freely adjust the height of the hanger assembly 1 so as to fit the user's practical requirement. In addition, the user only needs to rotate the hanger assembly 1 to attach the hanger assembly 1 to the stand 2 so that the hanger assembly 1 is mounted on the stand 2 easily, conveniently and quickly. Further, the first stop 1113 of the first recessed body 111 and the second stop 1123 of the second recessed body 112 are forced by the weight of the item 3 to press the stand 2 so that the hanger assembly 1 is suspended on the stand 2 closely. Further, the two anti-skid pads 12 abut the stand 2 to provide an anti-skid effect so that the hanger assembly 1 is firmly positioned on the stand 2.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A hanger assembly comprising:
a frame;
two anti-skid pads mounted on the frame; and
a hook mounted on the frame;
wherein:
the frame includes a first recessed body, a second recessed body, and a fixed post;
the first recessed body of the frame has a first transverse bar, two first side bars extending from two sides of the first transverse bar, a first slot defined between the two first side bars, and a first stop mounted on the first transverse bar;
the second recessed body of the frame has a second transverse bar, two second side bars extending from two sides of the second transverse bar, a second slot defined between the two second side bars, and a second stop mounted on the second transverse bar;
the fixed post of the frame is mounted between the first recessed body and the second recessed body to connect the first recessed body and the second recessed body, with an entrance being defined between the first recessed body and the second recessed body;
the two anti-skid pads are respectively mounted on the first stop of the first recessed body and the second stop of the second recessed body;
the hook is mounted on the second stop of the second recessed body of the frame; and
the hook and one of the two anti-skid pads are located at two opposite faces of the second stop of the second recessed body.

2. The hanger assembly of claim 1, wherein the second slot of the second recessed body corresponds to and aligns with the first slot of the first recessed body.

3. The hanger assembly of claim 2, wherein the first recessed body, the second recessed body and the fixed post are combined by an adhesive or by soldering.

4. The hanger assembly of claim 2, wherein the first recessed body, the second recessed body and the fixed post are formed integrally.

5. The hanger assembly of claim 2, wherein the first slot of the first recessed body and the second slot of the second recessed body construct a rectangular shape so that the first recessed body and the second recessed body are firmly attached to a rectangular upright of a stand.

6. The hanger assembly of claim 2, wherein the first slot of the first recessed body and the second slot of the second recessed body construct a circular shape so that the first recessed body and the second recessed body are firmly attached to a circular upright.

7. The hanger assembly of claim 6, wherein the first stop of the first recessed body has an arcuate face abutting the circular upright, and the second stop of the second recessed body has an arcuate face abutting the circular upright.

8. The hanger assembly of claim 2, wherein the first slot of the first recessed body and the second slot of the second recessed body construct a polygonal shape so that the first recessed body and the second recessed body are firmly attached to a polygonal upright.

9. The hanger assembly of claim 8, wherein the first stop of the first recessed body has a polygonal face abutting the polygonal upright, and the second stop of the second recessed body has a polygonal face abutting the polygonal upright.

10. The hanger assembly of claim 1, wherein each of the two anti-skid pads further extends into and sticks to a wall of the first slot of the first recessed body and a wall of the second slot of the second recessed body.

* * * * *